Jan. 27, 1931.  R. R. KEITH ET AL  1,790,099
VEHICLE BRAKE
Filed July 9, 1927  2 Sheets-Sheet 1

Inventors.
Robert R. Keith,
John Selzer
and James A. Bundy.
By

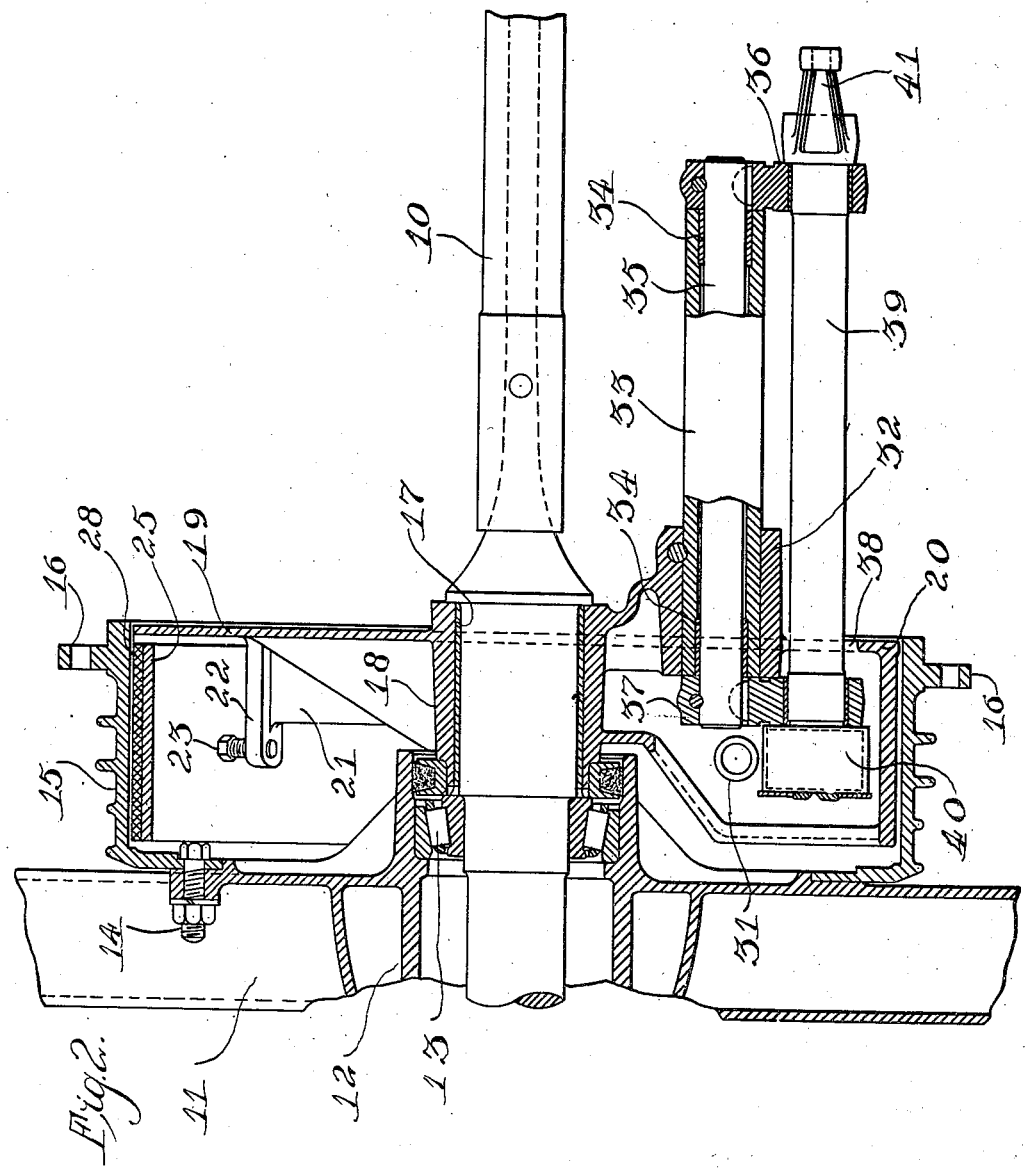

Patented Jan. 27, 1931

1,790,099

UNITED STATES PATENT OFFICE

ROBERT R. KEITH, OF HINSDALE, ILLINOIS, AND JAMES A. BUNDY AND JOHN SELZER, OF FORT WAYNE, INDIANA, ASSIGNORS TO INTERNATIONAL HARVESTER COMPANY, A CORPORATION OF NEW JERSEY

VEHICLE BRAKE

Application filed July 9, 1927. Serial No. 204,486.

This invention relates to brakes and especially to internal expanding brakes for motor vehicles of the heavy duty type.

In motor vehicles of the heavy duty type, such as motor trucks, it is difficult efficiently to brake the vehicle by the ordinary foot pressure controlled mechanical brakes.

In the brake of the present invention, it is proposed to provide a structure in which the rotation of the brake drum will cause the braking bands to be semi-self-energizing, that is, the rotational movement will cause the bands to wrap with a crowding action to frictionally engage the brake drums and brake the vehicle.

Accordingly, the objects of this invention are to provide an improved semi-self-energizing brake for heavy duty and other motor vehicles; to provide an improved brake band mounting and structure, including a novel anchor means located at the outer diameter of the brake drum; to provide such a brake in which the semi-self-energizing action is initiated by brake shoes which are spread apart by a cam carried on a floating cam shaft; to provide such a brake having a maximum freedom of movement so that the floating cam may adjust itself automatically with respect to the brake shoes efficiently to compensate for such wear as may occur on the brake band; and, lastly, generally to simplify and improve brakes for motor vehicles.

Briefly, these very desirable objects are achieved in a brake construction in which the vehicle wheel or other member carries the rotatable brake drum in the usual manner. The inner, open side of the drum is closed by a brake carrier plate comprising a member embodying an integral anchor member, and radial spreaders, at the ends of which are adjustable devices for spreading and carrying a metal band to which is riveted the usual lining or brake band. The ends of the metal band loosely contact and are held on the opposite sides of the anchor member adjacent the extreme outer diameter of the drum. Adjacent the anchor the metal band ends carry shoes between which is arranged a turnable cam fixed on a floating cam shaft which passes through a slot in the carrier plate, said shaft being substantially parallel with the vehicle axle and operable by any approved form of control means. The cam shaft is pivotally supported by brackets mounted on an auxiliary shaft journaled in the carrier plate, said shaft being substantially parallel with the cam shaft. A spring connects the shoes to hold them in a manner normally to embrace the cam and out of contact with the brake drum. This introductory description will suffice for the present.

In the accompanying sheets of drawings showing an illustrative embodiment which the invention may assume in practice,—

Figure 3 is a general face view of the member constituting the brake carrier plate.

Figure 1:
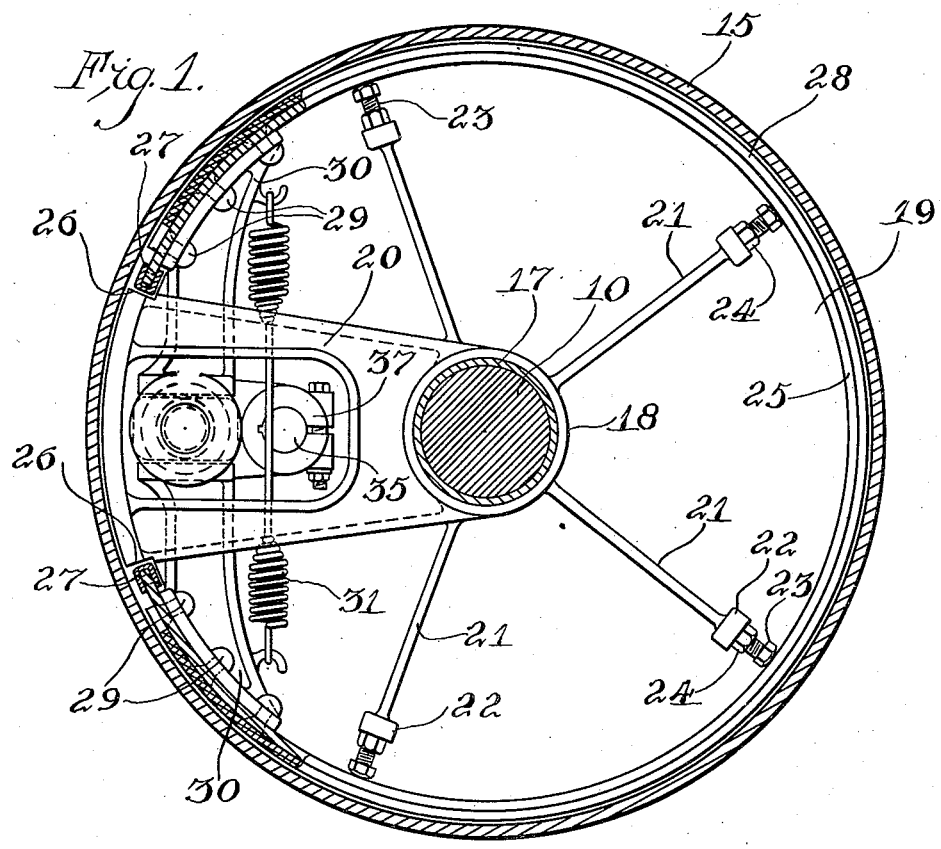
Figure 1 is a general face view of the brake, partly in section, as seen from the wheel side of the brake.

In these drawings the brake is associated with a motor vehicle having an axle 10, and a wheel 11, said wheel having a hub 12 mounted on a roller bearing 13.

Made fast to the inner face of the wheel by bolts 14 is a rotatable brake drum 15 having an extension flange 16 to which may be secured a sprocket ring (not shown) for the purpose of chain driving the wheel. Of course, any form of drive may be employed as far as the brake of this invention is concerned. Surrounding the axle of the vehicle, inside the drum, is a bushing 17.

Figure 2:
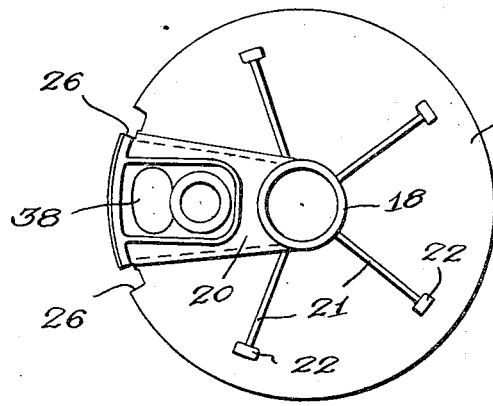
Figure 2 is a central, horizontal, sectional view through the improved brake.

Mounted on this bushing is the hub 18 of a brake carrier 19 comprising preferably a circular member in the form of a cover plate for closing the open side of the brake drum, as seen best in Figure 2, and embodying at its middle rear portion an integrally formed anchor member 20 extending as a segment from the hub 18 to the extreme outer periphery or diameter, where its edge lies circumferentially adjacent the inner edge of the brake drum 15. Extending radially from the hub 18 are spidered spreader flanges 21 having enlarged heads 22, each of which carries a radially adjustable bolt 23 and nut lock 24. These bolts 23 are adapted to be set to engage and support a circular, flexible, metal brake band 25 concentric with the brake drum 15 and spaced inwardly therefrom sufficiently to give the necessary clearance requisite for proper freedom of movement of the band relative to the drum.

The opposite edges of the anchor, as seen in Figure 1, adjacent the drum may be slightly notched at 26 if desired to receive wear plates 27 folded over and riveted to the ends of the metal band 25 where they contact the anchor. Secured in any approved manner to the metal band 25 is the fabric friction band 28 which engages the drum 15, as will later appear, when braking.

The adjacent ends of the metal band 25 each carry, by means of rivets 29, a brake shoe 30 arranged between the anchor 20 and face of the carrier plate 19, said shoes being connected by a resilient element in the form of a spring 31. The operating means for the brake band will next be described.

On the axle 10, the carrier 19 is provided with a transverse collar 32 in which is made fast, a tube 33 extending laterally inwardly of the vehicle near to the axle. This tube at its opposite ends is provided with bushings 34 for rockably journaling an auxiliary shaft 35 which at one end carries fast therewith a bracket 36 and at its other end, inside the drum 15, a similar bracket 37. Adjacent the auxiliary or rockshaft 35 the carrier plate 19 has formed therein an arcuate slot 38 concentric with the longitudinal axis of said rockshaft, (see Figure 3). Turnably mounted in the rear ends of the brackets 36 and 37 and co-extensively parallel with the rockshaft 35 is a cam shaft 39 which has fast thereon inside the drum 15, adjacent the spring 31, a cam 40 disposed between the brake shoes 30. At its other free end the cam shaft is provided with an operating crank arm 41. It will thus be seen that the cam shaft may float in an arc about the axis of the rockshaft 35. The operation of the improved brake will now be set forth.

An operator from his seat on the vehicle desiring to brake his vehicle actuates, by foot pressure in a conventional manner, the control, not shown, for rocking the operating crank arm 41 and with it the cam shaft 39, which causes the cam 40 to turn and spread apart the shoes 30, to which are made fast the respective ends of the metal band 25. This action causes the flexible metal band to expand so that the rotating drum picks it up frictionally to warp and stiffen the fabric lining 28 and with the metal band crowd against the rotating drum 15 with a wrapping action. Thus the turning drum, after the cam action has been initiated by foot pressure, energizes the bands to increase the wrapping, frictional action thereof considerably over what mere foot pressure alone could do. As a result, this improved brake structure is admirably adapted for use in the braking of heavy duty motor vehicles. When the braking action has been completed, the spring 31 helps return the cam to normal, non-spreading position with the shoes snugly embracing the cam.

The particular anchor structure is highly efficient, as it locates the anchor points at the extreme outer circumference adjacent the brake drum where the pressures of braking are the lowest. Thus, anchoring the band where the pressure is least, results in minimizing frictional wear on the metal band ends, as must be obvious.

The particular floating cam shaft mounting in the carrier plate also permits the necessary freedom of movement and clearance that make for efficient braking and take-up of such wear as might occur, as the floating cam shaft permits of self adjustment of the cam relative to the brake shoes. In this regard it is to be understood that an operating means, for the cam shaft, may be otherwise than the mechanical means herein shown.

The carrier plate embodying the particular stationary anchor structure and spreaders makes for simplicity and ease of inspection. The adjustable bolts at the spreader ends permit proper adjustment and support for the band relative to the drum.

From the above detailed disclosure, it will now be seen that an improved brake structure has been provided, which achieves all of the desirable objects heretofore set forth.

It is the intention to cover all such changes and modifications of the illustrative embodiment herein disclosed, as do not materially depart from the spirit and scope of this invention, as is indicated in the appended claims.

What is claimed is:

1. In a brake, the combination of a rotatable drum open at one side, a stationary, circular brake carrier plate closing said drum, radial spreader flanges on said plate which stop short of the periphery of the plate, adjustable means on the free ends of the flanges, a brake band carried by said adjustable means, and a stationary anchor on said plate for retaining the ends of the band.

2. In a brake, the combination of a rotatable drum, a stationary brake carrier plate, band supporting means on the plate, an anchor on the plate, a band on the supporting means, and wear plates at the ends of the bands loosely retained by the anchor.

3. In a brake, the combination of a rotatable drum, a stationary brake carrier plate, band supporting means on the plate, an anchor on the plate having notches therein adjacent the drum, a split band on the supporting means, and shoes on the band adjacent the split leaving free ends of the band engageable in the anchor notches.

4. In a brake, the combination of a rotatable drum, a stationary brake carrier plate having thereon band supports and an anchor, a band on the supports having its ends anchored against the sides of the anchor adjacent the outer periphery of the plate, shoes on the band ends, a shaft journaled in the plate, a second shaft pivotally connected to the first shaft and passing through a slot in the plate into the drum, and a cam on said second shaft for moving the shoes to permit the rotating drum to energize the band.

5. In a brake, the combination of a rotatable drum, a stationary brake carrier plate having thereon band supports and an anchor, a band on the supports having its ends anchored by the anchor adjacent the outer periphery of the plate, shoes on the band ends, a sleeve in the plate, a tube in the sleeve, a shaft in the sleeve, an arm connected to said shaft inside the drum, a cam shaft carried by said arm for floating movement about the axis of the first shaft, said cam shaft extending through a slot in the plate into the drum where it carries a cam, and operating means for the cam shaft whereby the cam may spread the shoes to permit the drum to energize the band.

6. In a brake, the combination of a circular rotatable drum open at one end, a stationary circular brake carrier plate closing said drum, said plate including integrally formed radial band supports and an anchor, and a split one-piece metal band carried loosely on said supports slightly spaced from the drum, said band carrying shoes adjacent its ends, said band ends projecting slightly beyond the shoes and being loosely anchored in notches in the anchor adjacent the outer periphery of the plate.

7. An integral one piece carrier for a brake comprising a circular brake drum closure plate having a central hub, radial spreaders extending from the hub, and an anchor member extending from the hub to the periphery of the plate and provided with band receiving notches at the periphery of the plate.

8. An integral one piece carrier for a brake comprising a circular brake drum closure plate having a central hub, radial spreaders extending from the hub, an anchor member extending from hub to periphery, and a shaft bearing sleeve in the plate adjacent the anchor, said plate being provided with an arcuate slot adjacent said sleeve for a floating cam shaft.

In testimony whereof we affix our signatures.

ROBERT R. KEITH.
JAMES A. BUNDY.
JOHN SELZER.